US011652388B2

(12) United States Patent
Remboski et al.

(10) Patent No.: US 11,652,388 B2
(45) Date of Patent: May 16, 2023

(54) LUBRICANT SUPPORTED EXTERNAL ROTOR ARCHITECTURES

(71) Applicant: Neapco Intellectual Property Holdings, LLC, Farmington Hills, MI (US)

(72) Inventors: Donald Remboski, Ann Arbor, MI (US); Jacqueline Dedo, Wolverine Lake, MI (US)

(73) Assignee: NEAPCO INTELLECTUAL PROPERTY HOLDINGS, LLC, Farmington Hills, MI (US)

( * ) Notice: Subject to any disclaimer, the term of this patent is extended or adjusted under 35 U.S.C. 154(b) by 342 days.

(21) Appl. No.: 17/090,452

(22) Filed: Nov. 5, 2020

(65) Prior Publication Data

US 2021/0135539 A1 May 6, 2021

Related U.S. Application Data

(60) Provisional application No. 62/931,294, filed on Nov. 6, 2019.

(51) Int. Cl.
*H02K 5/24* (2006.01)
*B60K 7/00* (2006.01)
(Continued)

(52) U.S. Cl.
CPC ............ *H02K 5/24* (2013.01); *B60K 7/0007* (2013.01); *F16C 32/0677* (2013.01); *H02K 7/116* (2013.01)

(58) Field of Classification Search
CPC .... B60K 2007/0038; B60K 2007/0092; B60K 7/0007; F16C 2326/02; F16C 2361/65;
(Continued)

(56) References Cited

U.S. PATENT DOCUMENTS 3,751,699 A * 8/1973 Gleichman ............... F16J 15/40
310/90
2007/0201779 A1* 8/2007 Kim ....................... F16C 33/107
384/107
(Continued)

FOREIGN PATENT DOCUMENTS

EP 1380459 A1 * 1/2004 ............... B60G 3/20
EP 1380459 A1 1/2004
(Continued)

*Primary Examiner* — Naishadh N Desai
(74) *Attorney, Agent, or Firm* — Dickinson Wright PLLC (57) ABSTRACT

A lubricant supported electric motor includes a stator and a rotor and a drive hub. The rotor is moveable relative to the stator and a gap is defined between the rotor and the stator. A lubricant is disposed within the gap to support the rotor relative to the stator and provide a bearing mechanism. The drive hub is coupled to the rotor such that rotation of the rotor causes rotation of the drive hub. The drive hub may be connected to the rotor via a coupler member that is torsionally stiff and axially and radially compliant. The stator may be fixed relative to a connection structure that extends radially within the stator. The connection member may support the drive hub for rotation. Lubricant is supplied via a passageway extending through the connection member into a chamber that includes the gap.

20 Claims, 4 Drawing Sheets

(51) Int. Cl.
  *H02K 7/116* (2006.01)
  *F16C 32/06* (2006.01)
(58) Field of Classification Search
  CPC ...... F16C 27/045; F16C 32/0677; F16D 3/72;
       F16D 3/76; H02K 2201/03; H02K 5/24;
       H02K 7/006; H02K 7/088; H02K 7/116
  See application file for complete search history.

(56) References Cited

U.S. PATENT DOCUMENTS

2008/0137229 A1* 6/2008 Nakamura ............. H02K 7/085
                                                     310/90
2019/0093757 A1* 3/2019 Remboski ........... F16H 57/0476

FOREIGN PATENT DOCUMENTS

| EP | 1832461 A1 | 9/2007 | |
|---|---|---|---|
| WO | WO-2012059129 A1 * | 5/2012 | ......... B60B 27/0026 |
| WO | WO-2013026659 A2 * | 2/2013 | ........... B60K 7/0007 |

* cited by examiner

LUBRICANT SUPPORTED EXTERNAL ROTOR ARCHITECTURES

CROSS-REFERENCE TO RELATED APPLICATIONS

The present application claims the benefit of previously filed U.S. Provisional Patent Application No. 62/931,294, filed Nov. 6, 2019, the entire content of which is hereby incorporated by reference in its entirety.

FIELD OF THE DISCLOSURE

The present disclosure relates generally to a lubricant supported electric motor. More specifically, the present disclosure relates to a lubricant supported electric motor with an external rotor and support structure for the rotor.

BACKGROUND OF THE DISCLOSURE

This section provides a general summary of background information and the comments and examples provided in this section are not necessarily prior art to the present disclosure.

Various drivelines in automotive, truck, and certain off-highway applications take power from a central prime mover and distribute the power to the wheels using mechanical devices such as transmissions, transaxles, propeller shafts, and live axles. These configurations work well when the prime mover can be bulky or heavy, such as, for example, various internal combustion engines ("ICE"). However, more attention is being directed towards alternative arrangements of prime movers that provide improved environmental performance, eliminate mechanical driveline components, and result in a lighter-weight vehicle with more space for passengers and payload.

"On wheel", "in-wheel" or "near-wheel" motor configurations are one alternative arrangement that distributes the prime mover function to each or some of the plurality of wheels via one or more motors disposed on, within, or proximate to the plurality of wheels. For example, in one instance, a traction motor, using a central shaft though a rotor and rolling element bearings to support the rotor, can be utilized as the "on wheel", "in wheel" or "near wheel" motor configuration. In another instance, a lubricant supported electric motor, such as described in U.S. application Ser. No. 16/144,002, can be utilized as the "on wheel", "in wheel", or "near wheel" motor configuration. While each of these motor configurations result in a smaller size and lighter weight arrangement as compared to the prime movers based on the internal combustion engine, they each have certain drawbacks and disadvantages.

For example, the utilization of traction motors as the "on wheel", "in wheel", or "near wheel" configuration still results in motors that are too heavy and not robust enough to shock loading to be useful for wheel-end applications. In other words, present traction motors are large, heavy structures supported by rolling element bearings, which are too heavy and large to be practical for wheel end applications.

SUMMARY OF THE INVENTION

The present disclosure is generally directed to a lubricant supported electric motor that includes a stator and a rotor movably disposed relative to the stator. The stator presents an stator raceway and the rotor presents an rotor raceway disposed in spaced relationship with the stator raceway to define at least one hydrostatic or hydrodynamic support chamber. A lubricant is disposed in the support chamber for supporting the rotor relative to the stator.

In one aspect, the rotor is disposed radially outside of the stator and the rotor is an external rotor. In another aspect, the rotor is disposed radially inside of the stator and the rotor is an internal rotor.

In one aspect, the wheel is supported by a drive hub with a portion that is disposed radially within the stator by wheel support bearings, and the rotor attaches to a radially outer portion of the drive hub. Rotation of the rotor rotates the wheel via the attached drive hub.

In one aspect, the rotor is coupled to the drive hub by a coupler member. The coupler member is radially and axially flexible and torsionally stiff.

In one aspect, a planetary gear system is disposed between the rotor and the drive hub.

In another aspect, a lubricant supported electric motor includes: a stator extending along an axis and defining an stator raceway; a rotor extending along the axis and moveable relative to the stator and presenting an rotor raceway, the rotor moveably disposed relative to the stator; wherein the rotor raceway is disposed in spaced relationship with the stator raceway to define at least one hydrostatic or hydrodynamic support chamber; a lubricant disposed in the support chamber radially between the rotor and the stator for supporting the rotor relative to the stator; and a drive hub coupled to the rotor, wherein the drive hub is rotatable in response to rotation of the rotor, the drive hub configured to rotate a wheel attached thereto.

In one aspect, the drive hub includes a disc portion and a post portion, wherein the disc portion extends radially outward from the post portion, and the post portion extends axially along the axis and is disposed radially within the stator.

In one aspect, the drive hub is coupled to the rotor via a coupler member.

In one aspect, the coupler member is torsionally stiff and axially and radially compliant.

In one aspect, the coupler member extends axially between the rotor and the drive hub and is attached directly to the drive hub and the rotor.

In one aspect, the coupler member extends between a ring gear and the drive hub and is attached directly to the drive hub and the ring gear, wherein the ring gear is operatively coupled to the rotor and rotates in response to rotation of rotor.

In one aspect, a wheel is fixedly attached to the drive hub.

In one aspect, rotation of the rotor is transferred directly to the drive hub, and rotation of the drive hub is directly transferred to the wheel such that the wheel rotates in accordance with the rotation of both the rotor and the drive hub.

In one aspect, rotation of the rotor is transferred to the drive hub via a planetary reduction assembly having a ring gear, and rotation of the drive hub is directly transferred to the wheel such that the wheel rotates in accordance with the rotation of the drive hub and the ring gear.

In one aspect, the stator is attached to a connection structure that extends axially within the stator.

In one aspect, the drive hub includes a post portion disposed radially within the connection structure and the connection structure supports the drive hub for rotation via bearings.

In one aspect, the stator is coupled to the connection structure via a coupler member, wherein the coupler member is torsionally stiff and axially and radially flexible.

In one aspect, a planetary gear system is disposed between the rotor and the drive hub, wherein rotation of the rotor is transferred to the drive hub via the planetary gear system.

In one aspect, the rotor is engaged with a plurality of planet gears, the plurality of planet gears engage a ring gear, and the ring gear is coupled to the drive hub via a coupler member.

In one aspect, the rotor is disposed radially inside the stator, and the planetary gear system is engaged with an inner diameter of the rotor.

In one aspect, the rotor and the stator have the same axial length.

In one aspect, a portion of the connection structure is disposed axially adjacent the rotor and a seal member extends between the connection structure and the rotor, the seal member in contact with both the connection structure and rotor, wherein the seal member is fixedly attached to the connection structure or the rotor.

In another aspect, a lubricant supported electric motor includes: a stator extending along an axis and defining an stator raceway; a rotor extending along the axis and moveable relative to the stator and presenting an rotor raceway, the rotor moveably disposed relative to the stator; a gap defined radially between the stator and the rotor, the gap configured to receive a lubricant therein for supporting the rotor relative to the stator; a drive hub attached to the rotor via a coupler member, wherein the coupler member is torsionally stiff and axially and radially compliant.

In one aspect, a connection structure supports the drive hub for rotation, wherein the drive hub includes a post portion extending axially into and radially within the connection structure, wherein the stator surrounds the connection structure.

In one aspect, a chamber is defined by the drive hub, rotor, and connection structure, wherein the gap is disposed within the chamber, wherein lubricant is provided to the chamber via a passageway formed in the connection structure.

In another aspect, a lubricant supported electric motor includes: a stator extending along an axis and defining an stator raceway; a rotor extending along the axis and moveable relative to the stator and presenting an rotor raceway, the rotor moveably disposed relative to the stator; a gap defined radially between the stator and the rotor, the gap configured to receive a lubricant therein for supporting the rotor around the stator; a plurality of planet gears in meshed engagement with the rotor; a ring gear in meshed engagement with the plurality of planet gears; a drive hub attached to the ring gear via a coupler member, wherein the coupler member is torsionally stiff and axially and radially compliant; and a connection member supporting the drive hub for rotation, wherein the stator is fixed relative to the connection member.

The lubricant supported electric motor is also light and small, and thus contributes to the overall design strategy for eliminating weight and size from automobiles and land vehicles. Other advantages will be appreciated in view of the following more detailed description of the subject invention.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION OF THE ENABLING EMBODIMENTS

Example embodiments of a lubricant supported electric motor will now be more fully described. Each of these example embodiments are provided so that this disclosure is thorough and fully conveys the scope of the inventive concepts, features and advantages to those skilled in the art. To this end, numerous specific details are set forth such as examples of specific components, devices and mechanisms associated with the lubricant supported electric motor to provide a thorough understanding of each of the embodiments associated with the present disclosure. However, as will be apparent to those skilled in the art, not all specific details described herein need to be employed, the example embodiments may be embodied in many different forms, and thus should not be construed or interpreted to limit the scope of the disclosure.

Figure 1:
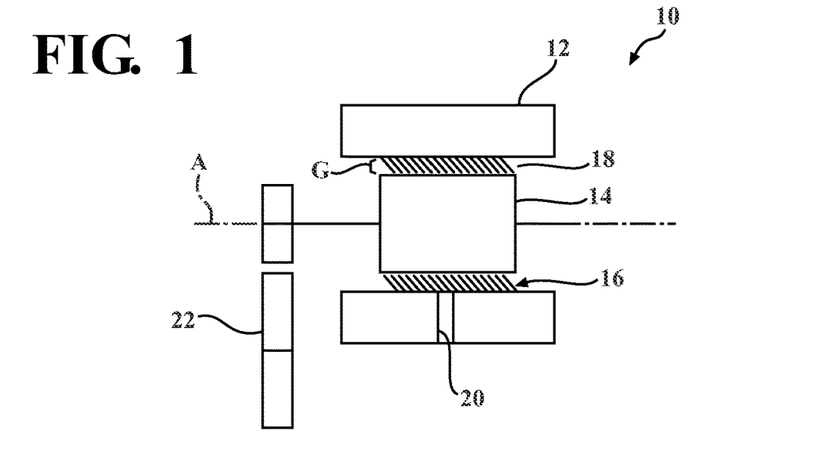
FIG. 1 is a schematic view of a lubricant supported electric motor according to an aspect of the subject disclosure.

FIG. 1 illustrates a lubricant supported electric motor 10 in accordance with an aspect of the disclosure. As illustrated schematically in FIG. 1, the lubricant supported electric motor 10 includes a stator 12 and a rotor 14 extending along an axis A and movably disposed within the stator 12 to define a gap 16 therebetween. A lubricant 18 is disposed in the gap 16 for supporting the rotor 14 within the stator 12, and providing continuous support between these components. The lubricant 18 may therefore act as a buffer (e.g., suspension) between the rotor 14 and stator 12 minimizing or preventing physical contact and friction therebetween. In other words, the lubricant 18 prevents direct contact between the stator 12 and rotor 14 and provides an electric lubricant supported motor 10 that is robust to shock and vibration loading due to the presence of the lubricant 18. Additionally, a substantially incompressible lubricant 18 may be used in order to minimize the gap between the stator 12 and rotor 14.

As further illustrated FIG. 1, the stator 12 defines a passageway 20 disposed in fluid communication with the gap 16 for introducing the lubricant 18. However, the passageway 20 could be provided on any other components of the lubricant supported electric motor 10 without departing from the subject disclosure. The passageway 20 functions to introduce the lubricant 18 into the necessary space between the rotor 14 and stator 12 and therefore can be provided along these alternative pathways. According to an aspect of the disclosure, the lubricant 18 may be cycled or pumped through the passageway 20 and into the gap 16 in various ways. For example, a high pressure source (e.g., a pump, not shown) of the lubricant 18 may be fluidly coupled to a low pressure source (e.g., a sump, not shown) of the lubricant 18, where the lubricant 18 may move from the high pressure source to the lower pressure source, through the passageway 20 and into the gap 16. Rotation of the rotor 14 relative to the stator 12 may also operate as a self-pump to drive lubricant 18 through the passageway 20 and into the gap 16. In one aspect, the passageway 20 is disposed in, on, or through a component of the motor 10 that remains generally stationary, such as the stator 20. However, in another aspect, the passageway 20 could alternatively be provided through a moveable or rotatable component having a rotatable coupling to the source of lubricant 18.

As further illustrated in FIG. 1, the rotor 14 is interconnected to a drive assembly 22 for coupling the lubricant supported electric motor 10 to one of the plurality of wheels of a vehicle. For example, in one instance, the drive assembly 22 may include a planetary gear system. Alternatively, the drive assembly 22 may include one or more parallel axis gears. The stator 12 and rotor 14 are configured to exert an electromagnetic force therebetween to convert electrical energy into mechanical energy, moving and rotating the rotor 14 and ultimately driving the wheel coupled to the lubricant supported electric motor 10 via the drive assembly 22. The drive assemblies 22 may provide one or more reduction ratios between the lubricant supported electric motor 10 and the wheel in response to movement and rotation of the rotor 14, depending on the requirements of the vehicle.

Figure 2:
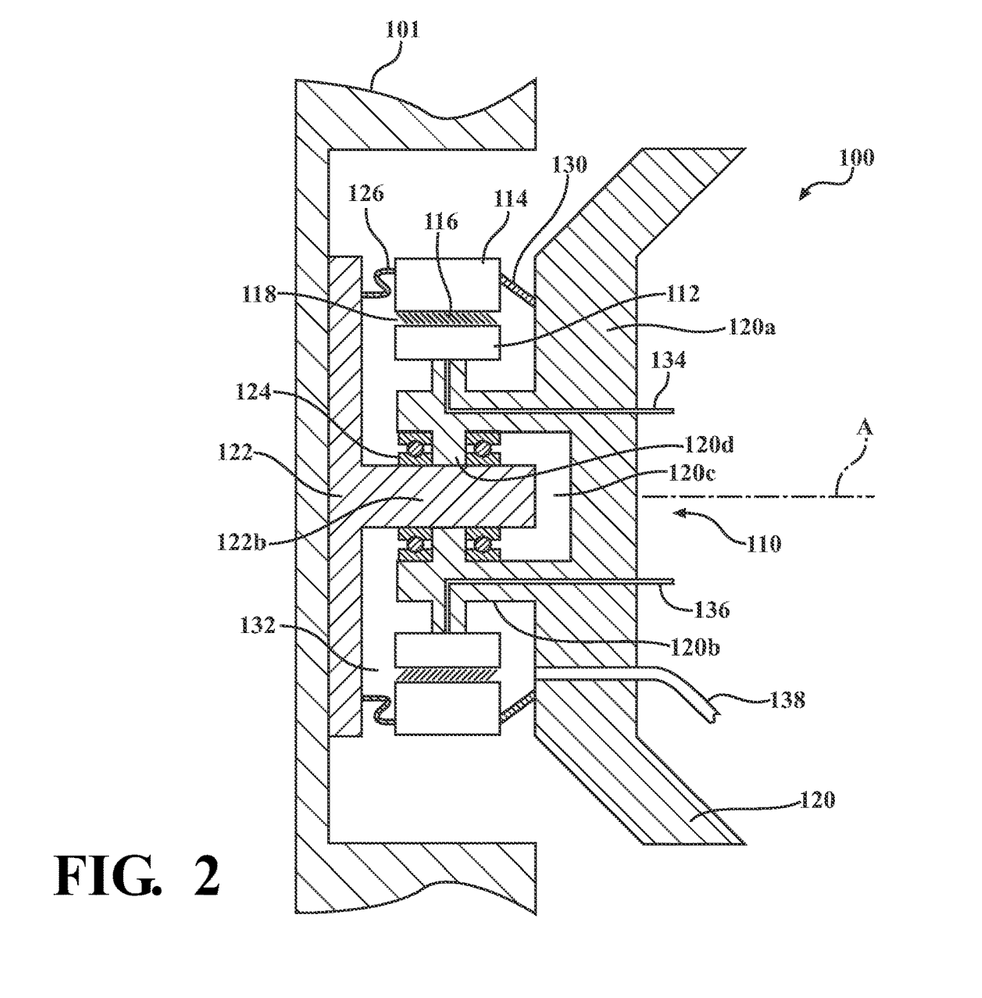
FIG. 2 is a cross-sectional view of another lubricant supported electric motor illustrating a drive hub disposed between a rotor and the wheel.

The above described aspect of the disclosure illustrated in FIG. 1 is directed to the illustrated embodiment in which the stator 12 surrounds the rotor 14. However, the general operation of the lubricant 18 and the relationship between the stator 12 and the rotor 14 may be used in alternative arrangements of the rotor 14 and stator 12, such as the rotor 14 being disposed radially outward from the stator 12, as further described below. In such instances, the wheel structure may still be driven by the rotor 14, and may be in the form of a direct drive motor or may include a reduction mechanism. Such an arrangement is further described below and an aspect of this arrangement is shown in FIG. 2. The above described advantages of the motor 10 may be similarly applicable to these alternative arrangements described below.

With reference to FIG. 2, a wheel end electric motor system 100 according to another aspect of the disclosure is provided. The system 100 may include a wheel 101 supported on a lubricant supported electric motor 110. This configuration may be desirable for single-track vehicles, such as scooters, where strong overturning moments on the wheel are reduced or non-existent. Of course, other vehicle types may also make use of this arrangement depending on the specific load and torque requirements.

The system 100 may include a stator 112 and a rotor 114 extending along an axis A movably disposed around the stator 112 to define a gap 116 therebetween. This arrangement is opposite that described previously in FIG. 1, which illustrated the rotor 14 disposed radially within the stator 12. The gap 116 is provided to support the rotor 114 around the stator 12.

A lubricant 118 is disposed in the gap 116 for supporting the rotor 114 around the stator 112, and providing continuous support between these components. As with the embodiment of FIG. 1, the lubricant 118 reduces or eliminates direct contact between the rotor 114 and the stator 112 while providing the desired support therebetween. The lubricant 118 may therefore act as a buffer (e.g., suspension) between the rotor 114 and stator 112 for minimizing or preventing contact and friction therebetween. In other words, the lubricant 118 prevents direct contact between the stator 112 and rotor 114 and provides an electric lubricant supported motor 110 that is robust to shock and vibration loading due to the presence of the lubricant 118. Additionally, a substantially incompressible lubricant 118 may be used in order to minimize the gap between the stator 112 and rotor 114.

As further illustrated in FIG. 2, the system 100 includes a connection structure 120. The connection structure 120 provides for a structure that may be connected to various non-rotational components in the system 100, such as a suspension mechanism or brake calipers (not shown). The connection structure 120 remains generally fixed relative to the electric motor 110. The connection structure 120 may serve as a base structure to which the other components of the system 100 are coupled and supported, either directly and indirectly.

Figure 3:
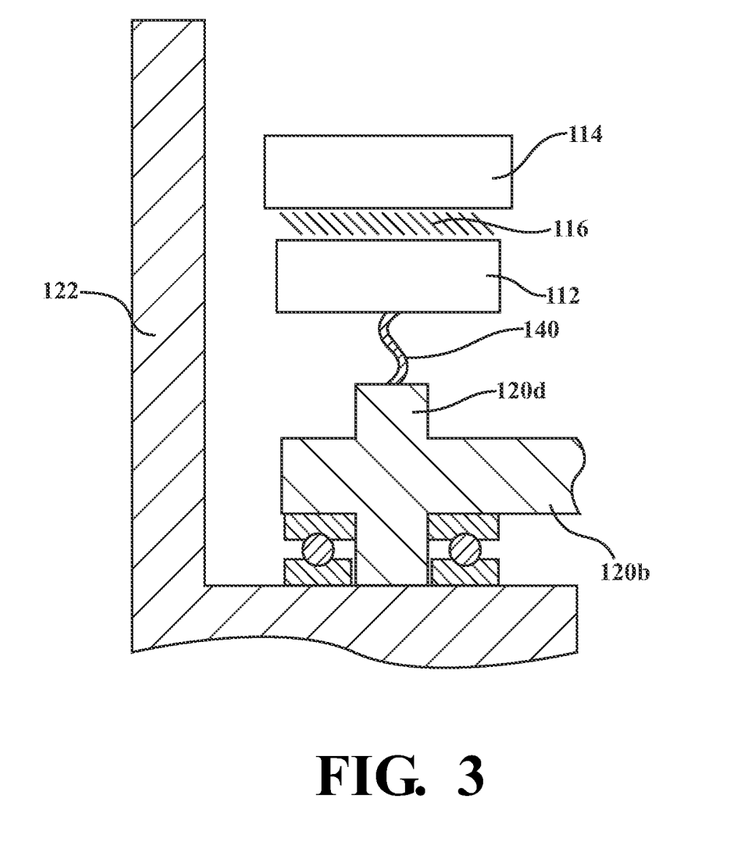
FIG. 3 is cross-sectional view of the lubricant supported electric motor of FIG. 2, and further illustrates a coupler member disposed between the a stator and a connection structure.

The stator 112 may be attached to the connection structure 120 in a generally fixed manner, as the stator 112 will remain generally rotationally stationary during operation of the system 100. The connection structure 120 may include an inner body portion 120a and an outer extension portion 120b. The outer extension portion 120b extends axially outward from the body portion 120a. Accordingly, the stator 112 may be disposed radially around the extension portion 120b. The extension portion 120b may have a generally cylindrical shape, defining a cavity 120c therein. The extension portion 120b may further include a circular or annular flange portion 120d that extends radially outward and radially inward relative to the sidewall of the cylindrical body extension portion 120b. FIG. 3 provides an illustration of such an arrangement.

The flange portion 120d may have an outer diameter that is slightly smaller than an inner diameter of the stator 112. The stator 112 may therefore be attached to the outer circumferential edge defined by the flange portion 120d. Accordingly, the stator 112 is disposed radially outward but generally axially aligned with the flange portion 120d.

The rotor 114 is disposed radially outward relative to the stator 112 and defines the gap 116 radially between the stator 112 and the rotor 116. As described above, the lubricant 118 may be disposed within the gap 116 to support the rotor 114 and stator 112 relative to each other and keep them spaced apart during operation of the motor 110.

The system 110 may further include a drive hub 122 that is attached directly to the wheel 101. The drive hub 122 is configured to be the component that rotates the wheel 101, and is the component that is ultimately rotated at the same rotation speed as the desired rotational speed of the wheel 101. In the case of a direct drive arrangement, the rotor 114 and the drive hub 122 will rotate at essentially the same speed. However, in the case of gear reduction, the rotor 114 and drive hub 122 may rotate at different rotational speeds.

The drive hub 122 may have an outer disc portion 122a and a post portion 122b that extends axially inward from the middle of the disc portion 122a. The disc portion 122a may have a diameter that extends to approximately the radial location of the rotor 114, such that the disc portion may be coupled to the rotor 114. The disc portion 122a may therefore be considered to have a generally similar diameter as that of the rotor 114.

According to an aspect, the post portion 122b extends axially into the cavity 122c that is defined by the extension portion 120b of the connection structure 120, which was described previously above. The post portion 122b therefore is disposed radially within the stator 112. The post portion 122b is further disposed radially within the flange portion 122d, as well as radially within the connection portion. More particularly, the post portion 122b is disposed radially within the inner diameter of the inner portion of the flange portion 122d, which, as described above, extends both radially outward and radially inward from the extension portion 120b.

The post portion 122b provides cantilevered support of the wheel 101 relative to the connection structure 120. The post portion 122b has a generally cylindrical or circular profile, and is rotatable relative to the connection structure 120 and the flange 120d thereof. The post portion 122b is similarly rotatable relative to the stator 112. The post portion 122b will rotate in response to the rotation of the rotor 114 relative to the stator 112.

The post portion 122b may be further supported by a plurality of support bearings 124. The support bearings 124 may be disposed radially between the post portion 122b and the extension portion 120b of the connection structure 120. The support bearings 124 may be disposed on both axial sides of the flange portion 120d, such that some of the bearings 124 are axially inward relative to the flange portion 120d and some bearings 124 are axially outward relative to the flange portion 120d. The support bearings 124 permit the post portion 122b to rotate relative to the connection structure 120 that is supporting the drive hub 122 and post portion 122b.

According to an aspect, other types or arrangements of bearings 124 may also be used. For example, bearings 124 may be disposed on only the axially inner side of the flange portion 124 or only on the axially outer side of the flange portion 120d. In one aspect, the flange portion 120d may not extend axially inward from the extension portion 120b, and bearings 124 may be provided in its place. In one aspect, bearings 124 may be disposed on a radially inner surface of the flange portion 120d. In one aspect, the flange portion 120d itself may act as the bearing structure.

The drive hub 122 may be coupled to the rotor 114 at a radially outward area of the disc portion 122a. Put another way, the rotor 114 may be attached to the radially outer edge of the drive hub 122. The drive hub 122 may be coupled to the rotor 114 via a compliant coupling member 126. The coupling member 126 may be arranged and configured to be torsionally stiff or sufficiently torsionally rigid to transfer the rotational load from the rotor 114. Thus, when the rotor 114 rotates, the drive hub 122 will rotate therewith at effectively the same rotational speed.

With the rotor 114 being disposed outside of the stator 112 and having a relatively large diameter, the coupling member 126 may therefore have a similarly relative large diameter. Thus, with the larger diameter, the necessary torsional stiffness is less than for a smaller diameter to transfer a given amount of torque. Thus, the coupling member 126 may therefore be made from a thinner material, reducing the overall weight of the system 100.

The coupling member 126, while being torsionally stiff, may also be radially and axially flexible. This radial and axial flexibility is possible in part due to the thinner material required due to the increased outer diameter of the rotor 114 and the coupling member 114. The coupling member 126 may have a generally S-shaped cross-section, as shown in FIG. 2. This cross-section allows the drive hub 122 to shift axially inward or axially outward relative to the rotor 114. The cross-section further allows the drive hub 122 to shift radially "up and down" or "in and out" with reference to FIG. 2.

In another aspect, the coupling member 126 may have other cross-sectional shapes that provide sufficient torsional stiffness while remaining radially and axially compliant. In an alternative aspect, the rotor 114 may be directly attached to the drive hub 122 without the use of the coupling member 126.

The system 100 further includes a seal member 130 disposed axially between the rotor 114 and the connection structure 120. The seal member 130 may have an annular shape, and extends between the rotor 114 and the connection structure to seal the interior of the motor 110 from the outside environment. The seal member 130 may be fixed to either the rotor 114 or the connection structure 120. The rotor 114 rotates relative to the connection structure 120, and therefore either the rotor 114 will rotate relative to the seal member 130 fixed to the connection structure 120, or the seal member 130 will rotate with the rotor 114 and relative to the connection structure 120. The seal member 130 is preferably biased toward the rotor 114 or connection structure 120 (whichever structure the seal member 130 is not fixed to), such that as the seal member 130 moves relative to this other structure (keeping in mind that the seal member 130 may be "fixed" and the relative movement may occur due to rotation of the rotor 114), the seal member 130 will remain engaged with the other structure to provide its sealing functionality.

The system 100 defines an interior cavity 132 that is defined by multiple components previously described. More particularly, the interior cavity 132 may be defined by portions of the connection structure 120, the seal member 130, the rotor 114, the coupling member 126, and the drive hub 122. The cavity 132 may therefore be filled by the lubricant 118, which may reach the gap 116 other interior locations within the cavity 132.

The lubricant 118 may enter the cavity 132 via a passageway 134 that may be defined by the connection structure 120. The passageway 134 may extend through the connection structure 120 and through the flange portion 120d toward the stator 112, and may further extend through the stator 112 toward the gap 116. FIG. 2 illustrates one possible path for the passageway 134. However, the passageway 134 may also direct the lubricant 118 to other locations within the cavity 132, and the lubricant 118 may then flow into the gap 116 via the space of the cavity 132.

The connection structure 120 may also include a path 136 for the stator phase current to be transmitted to the stator 112 for driving the rotor 114 relative to the stator 112. The operation of the rotor 114 and stator 112 via the use of phase current may be performed in a manner known in the art.

The connection structure 120 may further include a drain passageway 138 formed in the connection structure 120 and in fluid communication with the cavity 132. The drain passageway 138 may permit the lubricant 118 to flow out of the cavity 132 and be replaced by the lubricant 118 that flows into the cavity 132 via the passageway 134.

According to an aspect, the lubricant 118 may be cycled or pumped through the passageway 134 and into the gap 116 in various ways. For example, a high pressure source (e.g., a pump, not shown) of the lubricant 118 may be fluidly coupled to a low pressure source (e.g., a sump, not shown) of the lubricant 118, where the lubricant may move from the high pressure source to the lower pressure source, through the passageway 134 and into the gap 116. Rotation of the rotor 114 relative to the stator 112 may also operate as a self-pump to drive lubricant 118 through the passageway 134 and into the gap 116.

During operation of the motor 110, the lubricant 118 may be drained from the gap 116 via drain passageway 138, and may be directed back toward the pump, with fresh lubricant 118 replacing the used lubricant 118. Accordingly, the lubricant 118 may be cycled through the motor 110.

The above-described arrangement of the system 100 allows for the lubricant supported rotor 114 to stator 112 interface to reduce the requirements for stiff rotor support. By supporting the rotor 114 on the stator 112, the coupling member 126 may be made lightweight and flexible while still providing robust torque transferring capabilities from the rotor 114 to the drive hub 122 (and then to the wheel 101 from the drive hub 122), while at the same time effectively decoupling axial and radial motion from the drive hub 122 through the use of the coupling member.

By disposing the rotor 114 around the stator 112 in the manner shown in FIG. 2 and described above, the stiff nature of the rotor to stator interface permits the motor 110 to operate at high loads with cantilevered end support of the both the rotor 114 and stator 112 structures, thus simplifying the overall motor 110 structure. For example, a motor with a low aspect ratio may be practical due to the uniform support along the length of the rotor 114 by the stator 112 that is provided by the lubricant that extends substantially fully across the interface between the rotor 114 and the stator 112, as opposed to being limited to the location of discrete bearings.

In one aspect, the rotor 114 and stator 112 may have approximately the same axial length, with the interface therebetween being generally defined by the axial length of each of the rotor 114 and stator 112.

In another aspect, the axial lengths of the rotor 114 and stator 112 may be different. For example, the rotor 114 may be axially longer than the stator 112, or the stator 112 may be axially longer than the rotor 114. In this arrangement, the interface therebetween is generally defined by the lesser axial length.

In one aspect, the rotor 114 and stator 112 may axially aligned, as shown in FIG. 2. In another aspect, the rotor 114 and stator 112 may be axially offset such that they partially overlap each other, but some axial portions of the rotor 114 and/or stator 112 due not overlap. In this arrangement, the interface therebetween is generally defined by the axial length of the overlap between the rotor 114 and stator 112. The interface being defined by the overlap applies regardless of the relative axial lengths of the rotor 114 and stator 112.

In one aspect, shown in FIG. 3, the interface between the stator 112 and the connection structure 120, and more particularly the flange portion 120*d* of the connection structure, may include a compliant coupling member 140 disposed radially therebetween. In one aspect, the flange portion 120*d* may be excluded and the compliant coupling member 140 may extend between the extension portion 120*b* and the stator 112. The compliant coupling member 140 disposed radially between the flange portion 120*d* (or extension portion 120*b*) and the stator 112 may be similar to the coupling member 126 described above, such that it has torsional stiffness while being flexible radially and axially. Accordingly, this compliant structure may have a similar S-shaped design.

In both coupling members 126 and 140, the illustrated S-shaped design may be used. However, other torsionally stiff compliant designs could also be used. For example, an accordion-type structure could be used in one approach. A dual s-shaped or dual accordion design could be used to provide addition torsional support in some cases. A stepped cross-section or a z-shaped design could be used, in one aspect.

The above described system 100 with the described rotor and stator support makes possible wider rotor and stator configurations without the risk of rotor to stator contact when the drive hub 122 and the support bearings 124 deflect under load. The wider configuration results in higher torque capacity and efficient packaging at the wheel end.

The above described system 100 refers to a direct-drive motor, where the rotation of the rotor 114 is directly transferred to the wheel 101 without reduction. However, the above described arrangement of system 100 can also be applied to systems having gear reduction.

Figure 4:
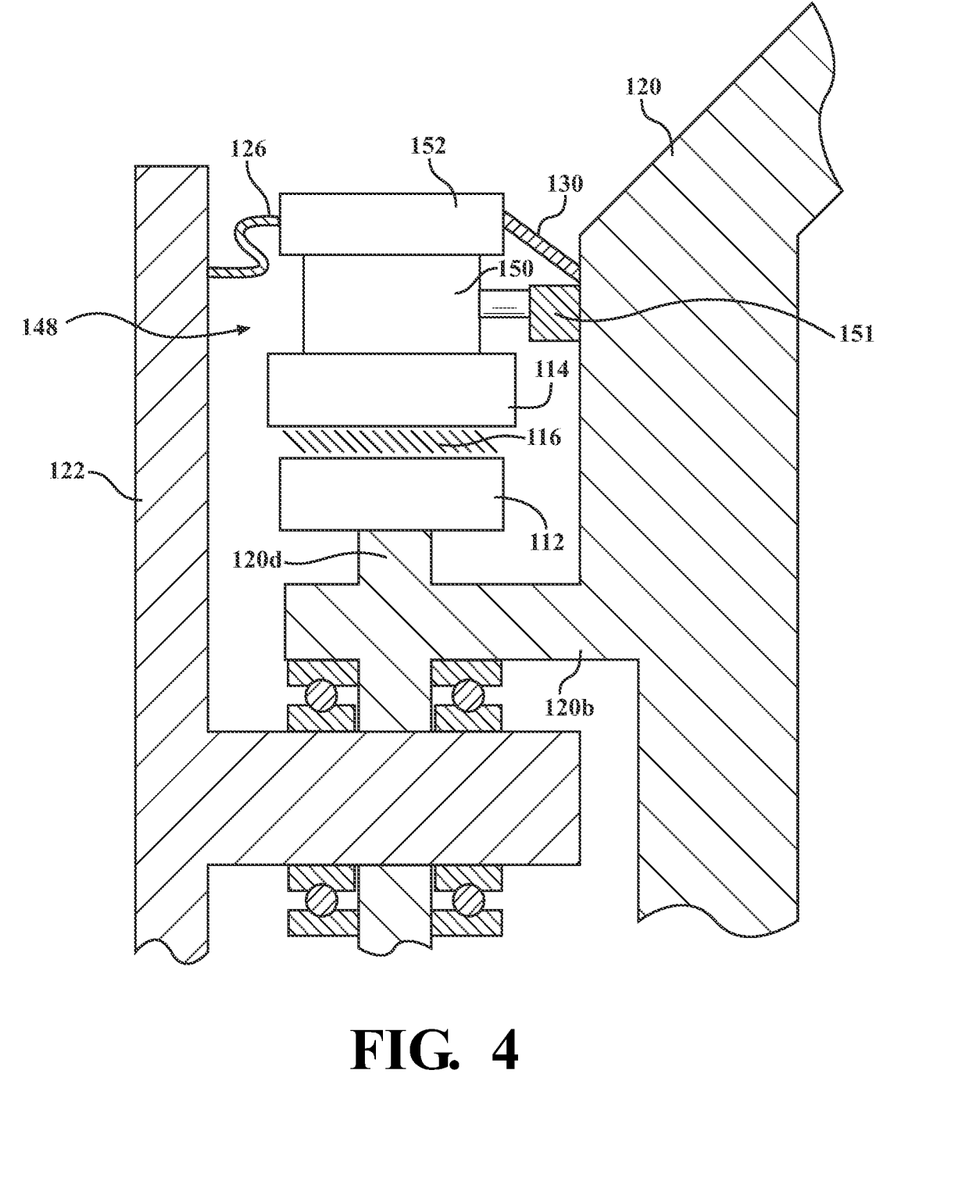
FIG. 4 is a cross-sectional view of planetary gear system for another lubricant supported electric motor.

For example, with reference to FIG. 4, the rotor 114 may be configured to drive a planetary reducer assembly 148 that is supported by the rotor-stator bearing on one side and the wheel bearing system on the other side. The rotor 114 may include external teeth (not explicitly shown) that may engage planet gears 150 that are held in place on a planet carrier 151 that is typically fixed to the connection structure 120. The planet gears 150 may engage internal teeth on a ring gear 152. The ring gear 152 may be coupled to the drive hub 122 via the coupler member 126. The seal member 130 may similarly be attached to the ring gear 152.

The operation of the system 100, and its advantages, in the case of the use of the planetary reducer 148 is similar to that of the system 100 shown in FIGS. 2 and 3. The gap 116 is still defined between the rotor 114 and stator 112 in the same manner. The drive hub 122 may be supported in a similar fashion. Coupling member 126 remains torsionally stiff and axially and radially compliant. Additional similarities will be apparent to those skilled in the art.

However, the speed that the drive hub 122 rotates corresponds to the speed of the ring gear 152, rather than the speed of the rotor 114. For a given drive hub 122 size, the rotor 114 diameter is smaller than that of FIG. 2. Or, for a given rotor 114 size, the diameter of the drive hub 122 is increased relative to that of FIG. 2. Accordingly, the same stator 112 and rotor 114 parts may be used for larger wheels and drive hubs 122 by using the planetary reducer 148 in the system 100.

As the rotor 114 is caused to rotate by energizing the stator 112, the planet gears 150 will correspondingly rotate due to their meshed engagement with the outer diameter of the rotor 114. The planet gear 150 rotation is transferred to the ring gear 152 by the meshed engagement therebetween, causing the ring gear 152 to rotate and the drive hub 122 to rotate via the torsionally stiff coupling member 126.

As described and shown above, the stator 112 and rotor 114 are arranged such that the rotor 114 surrounds the stator 112 and may be considered an external rotor. However, the lubricant supported arrangement described herein may also be used for internal rotors, such as rotors that are disposed radially within a stator. For example, FIG. 1 illustrates rotor 14 disposed within stator 12.

It will be appreciated that many of the above aspects related to the external rotor may also apply to an internal rotor. For example, and with reference to FIG. 5, a planetary reduction assembly 248 may be used along with stator 212 and rotor 214. The planetary reduction assembly 248 may include planet gears 250, which are directly connected to the inside diameter of rotor 214, via meshed engagement or the like, and disposed inside of the rotor 214. Planet gears 250 may be carried by planet carrier 251. This is the internal rotor version of what was described above with reference to FIG. 4. Ring gear 252, which is disposed radially within the series of planet gears 250, rotates in response to rotation of planet gears 250 and the rotation of ring gear 252 is transferred to hub 222.

Figure 5:
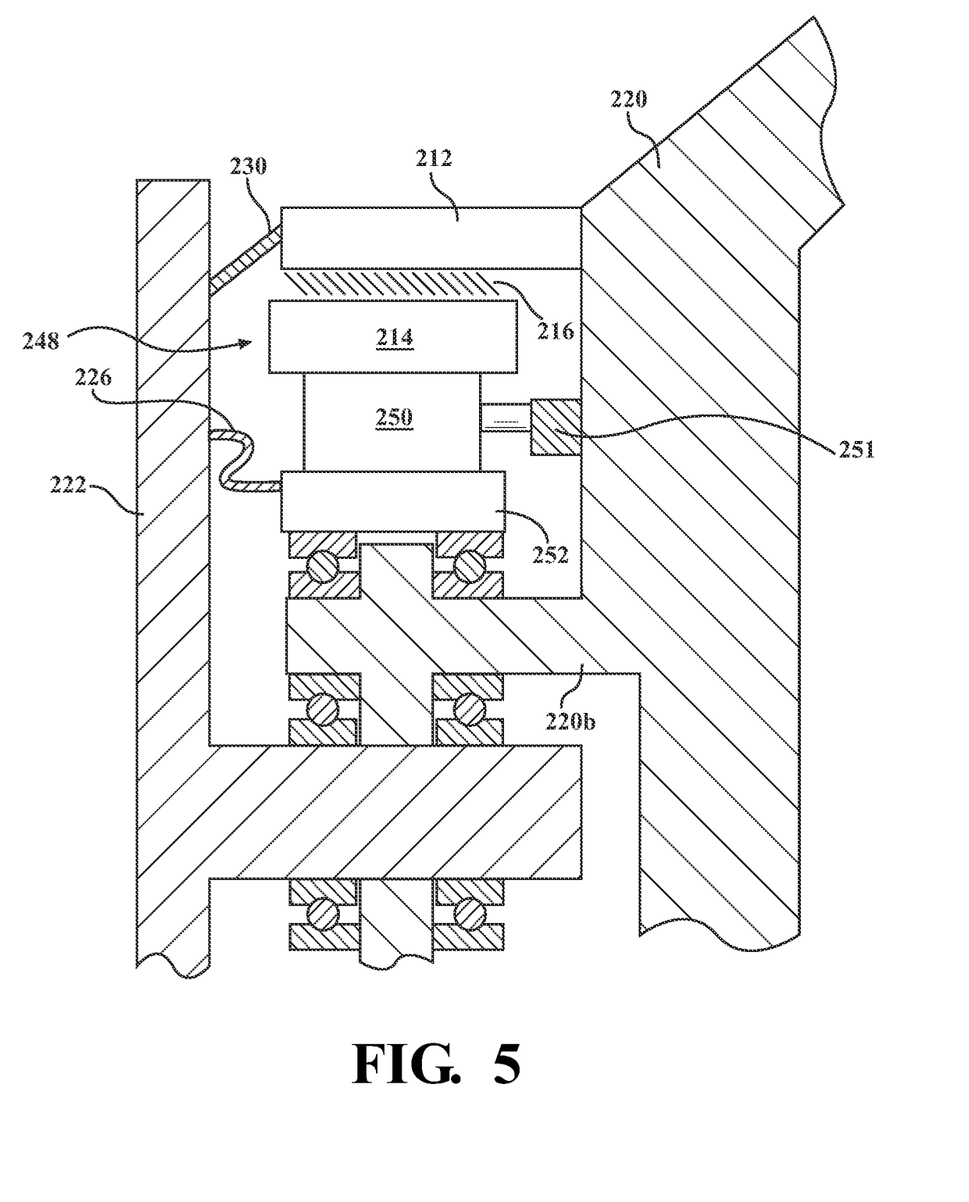
FIG. 5 is a cross-sectional view of a planetary gear system for another lubricant supported electric motor.

FIG. 5 further illustrates gap 216 radially disposed between the rotor 214 and the stator 212, with rotor 214 disposed radially within the stator 212. A seal member 230, similar to seal member 130, may be disposed between hub 222 and stator 212. Because hub 222 rotates relative to stator 212, seal member 230 is fixed to one of hub 222 or stator 212, with an opposite side of the seal member 230 configured to be biased against the other component for sealing but capable of rotating relative thereto. Connection structure 220 is fixed in place, and stator 212 is fixed relative to connection structure 220. Coupler member 226 extends between and attaches ring gear 252 to hub 222. Coupler member 226 is torsionally stiff and axially and radially compliant. Hub 222 is supported by extension portion 220*b* of connection structure 220. Ring gear 252 may rotate relative to extension portion 220*b*, as does hub 222, which rotates in response to rotation of ring gear 252, with torque being transferred to hub 222 via coupler member 226.

It will be appreciated that other arrangements of a planet gear system may be used with an internal rotor arrangement, and the illustrated embodiment is one example and should not be interpreted to be limiting relative to other arrangements.

The foregoing description of the present disclosure has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A lubricant supported electric motor comprising:
a stator extending along an axis;
a rotor extending along the axis and movably disposed around the stator to define a gap therebetween;
a lubricant disposed in the gap for supporting the rotor around the stator;
a drive hub coupled to the rotor and rotatable in response to rotation of the rotor for rotating a wheel attached thereto;
a connection structure extending axially within the stator; and
the stator coupled to the connection structure via a stator coupler member that is torsionally stiff and axially and radially flexible.

2. The lubricant supported electric motor of claim 1, wherein the drive hub includes a disc portion and a post portion, wherein the disc portion extends radially outward from the post portion, and the post portion extends axially along the axis and is disposed radially within the stator.

3. The lubricant supported electric motor of claim 1, wherein the drive hub is coupled to the rotor via a rotor coupler member.

4. The lubricant supported electric motor of claim 3, wherein the rotor coupler member is torsionally stiff and axially and radially compliant.

5. The lubricant supported electric motor of claim 3, wherein the rotor coupler member extends axially between the rotor and the drive hub and is attached directly to the drive hub and the rotor.

6. The lubricant supported electric motor of claim 3, wherein the rotor coupler member extends between a ring gear and the drive hub and is attached directly to the drive hub and the ring gear, wherein the ring gear is operatively coupled to the rotor and rotates in response to rotation of rotor.

7. The lubricant supported electric motor of claim 1, further comprising a wheel fixedly attached to the drive hub.

8. The lubricant supported electric motor of claim 7, wherein rotation of the rotor is transferred directly to the drive hub, and rotation of the drive hub is directly transferred to the wheel such that the wheel rotates in accordance with the rotation of both the rotor and the drive hub.

9. The lubricant supported electric motor of claim 7, wherein rotation of the rotor is transferred to the drive hub via a planetary reduction assembly having a ring gear, and rotation of the drive hub is directly transferred to the wheel such that the wheel rotates in accordance with the rotation of the drive hub and the ring gear.

10. The lubricant supported electric motor as set forth in claim 1, wherein the drive hub includes a post portion disposed radially within the connection structure and the connection structure supports the drive hub for rotation via bearings.

11. The lubricant supported electric motor as set forth in claim 1, further comprising a planetary gear system disposed between the rotor and the drive hub, wherein rotation of the rotor is transferred to the drive hub via the planetary gear system.

12. The lubricant supported electric motor as set forth in claim 11, wherein the rotor is engaged with a plurality of planet gears, the plurality of planet gears engage a ring gear, and the ring gear is coupled to the drive hub via a coupler member.

13. A lubricant supported electric motor comprising:
a stator extending along an axis;
a rotor extending along the axis and movably disposed around the stator to define a gap therebetween;
a lubricant disposed in the gap for supporting the rotor around the stator;
a drive hub coupled to the rotor and rotatable in response to rotation of the rotor for rotating a wheel attached thereto;
the stator attached to a connection structure that extends axially within the stator;
a portion of the connection structure disposed axially adjacent the rotor; and
a seal member extending between and in contact with both the connection structure and the rotor and fixedly attached to the connection structure or the rotor.

14. A lubricant supported electric motor comprising:
a stator extending along an axis;
a rotor extending along the axis and moveably disposed relative to the stator to define a gap extending radially therebetween;
a lubricant disposed in the gap for supporting the rotor relative to the stator;
a drive hub attached to the rotor via a coupler member that is torsionally stiff and axially and radially compliant;
a connection structure supporting the drive hub for rotation about the axis;
a chamber defined by the drive hub, the rotor, and the connection structure;
the gap disposed within the chamber; and
the connection structure defining a passageway disposed in fluid communication with the chamber for providing lubricant to the chamber and the gap.

15. The lubricant supported electric motor according to claim 14, wherein the drive hub includes a post portion extending axially into and radially within the connection structure, and wherein the stator surrounds the connection structure.

16. The lubricant supported electric motor according to claim 13, further comprising a coupler member extending axially between the rotor and the drive hub for establishing the coupled relationship therebetween.

17. The lubricant supported electric motor according to claim 16, wherein the coupler member has a generally S-shaped cross section.

18. The lubricant supported electric motor according to claim 16, wherein the drive hub includes a disc portion and a post portion, wherein the disc portion extends radially outward from the post portion, the post portion extends axially along the axis and is disposed radially within the stator, and the coupler member extends axially between a radially outward area of the disc portion and the drive hub.

19. The lubricant supported electric motor according to claim 18, wherein the post portion is disposed radially within the connection structure and the connection structure supports the drive hub for rotation via bearings.

20. The lubricant supported electric motor according to claim 1, wherein the connection structure includes an inner body portion, an outer extension portion extending axially outward from the inner body portion, and an annular flange portion extending radially outward from the outer extension portion, and wherein the stator is disposed radially outward of and interconnected to the annular flange portion via the stator coupler member.

\* \* \* \* \*